United States Patent [19]

Therien et al.

[11] Patent Number: 4,498,761
[45] Date of Patent: Feb. 12, 1985

[54] CINE-MODE CAMERA

[75] Inventors: Robert D. Therien, Newbury Park; Forrest L. Langford, Northridge; Armond Motamed, Encino; Robert D. Williams, Agoura, all of Calif.

[73] Assignee: Terminal Data Corporation, Woodland Hills, Calif.

[21] Appl. No.: 527,774

[22] PCT Filed: Jan. 21, 1983

[86] PCT No.: PCT/US83/00103
§ 371 Date: Mar. 17, 1983
§ 102(e) Date: Mar. 17, 1983

[87] PCT Pub. No.: WO84/02985
PCT Pub. Date: Aug. 2, 1984

[51] Int. Cl.³ .................... G03B 27/32; G03B 27/52
[52] U.S. Cl. ...................................................... 355/24
[58] Field of Search .............. 355/35 H, 14 SH, 23, 355/51, 65, 66, 24

[56] References Cited

U.S. PATENT DOCUMENTS

| 2,747,462 | 5/1956 | Jones | 355/24 X |
| 3,212,399 | 10/1965 | Walter | 355/24 |
| 3,885,871 | 5/1975 | Galatha et al. | 355/23 |
| 3,981,580 | 9/1976 | Yamashita | 355/24 |

FOREIGN PATENT DOCUMENTS

2738718 3/1978 Fed. Rep. of Germany ........ 355/23

Primary Examiner—L. T. Hix
Assistant Examiner—Della J. Rutledge
Attorney, Agent, or Firm—Harry R. Lubcke

[57] ABSTRACT

A camera for photographing the front and back of translating documents (1), having a dual optical system (4–8; 20–22), and one oscillating mirror (9) to demotionalize the images for cine-mode orientation upon a stationary microfilm strip (12) that is advanced during the interval between documents. Two microprocessors (50,56) with supporting memories (53,59) and interface elements (54,58) convert incoming instructions to correlated control information for document and film translation and scanning galvanometer actuation.

14 Claims, 7 Drawing Figures

CINE-MODE CAMERA

TECHNICAL FIELD

This invention pertains to a microfilm camera for photographing the front and back of translating documents in a side-by-side relation upon a strip of film.

BACKGROUND ART

U.S. Pat. No. 3,981,580 discloses what superficially resembles the subject invention. However, only two narrow mirrors are used and the images of the front and the back of the document are exposed upon the microfilm in the comic-mode. That is, one document image is followed by the next, and the next, along the film strip as pictures in a comic strip. The front of each document is in one row and the rear of each document is in a parallel row. This is a rather common mode, since it is easy to accomplish.

U.S. Pat. No. 3,885,871 discloses only an optical system, but one that does accomplish the cine-mode. That is, one document image is above the other, as are the images on a motion picture film. The front and rear of each document are side by side.

However, large mirrors (six) are employed so that the whole extent of the document is carried through the mirror optical system to the microfilm strip. This makes the apparatus undesirably large.

Means to illuminate the documents or means to demotionalize the image thereof are not shown nor mentioned. Thus, disclosure is incomplete. It may be presumed that a fast strobe flash of illumination would be required, but such is not shown nor mentioned, nor are necessary means to synchronize this illumination with the motions of the documents and the film.

SUMMARY OF THE INVENTION

A camera in which images of typically a continuously moving succession of spaced rectangular documents, such as bank checks, are demotionalized and the image of the front and back of each document is exposed on a temporarily stationary film strip. This is the cine-mode, with the direction of motion of the document transverse to the length of the film strip during exposure. The images of the front and the back of each document are side-by-side across the film strip.

Demotionalization of the images to stationary status is accomplished by a single mirror that is rotated by a galvanometer synchronously with the motion of the documents. Images of both sides of each document are impinged upon the single mirror, which is rapidly rotated back to its starting position during the traverse of the space between documents.

This system films documents upon demand rather than at regular intervals, as would be the case for a uniform succession of documents. Thus, the documents may be irregularly spaced and/or intermittently available.

The image of the rear of the document is impinged upon the single mirror by two oppositely inclined mirrors behind the document path and a first group of three mirrors; while an image of the front of the document is impinged upon the single mirror by a second group of three mirrors. The last two mirrors of each group of three rotates the images by 90° to the cine-mode.

One objective lens receives the front and rear images from the single mirror and images these, side-by-side, on the stationary film strip. The film strip is moved by a vacuum capstan during the interval between arriving documents, and is held stationary by a vacuum platen during exposure.

The apparatus is controlled by electronic means having plural microprocessors, each with supporting memories, clocks, and input/output (I/O) interfaces. Overall instructions from the user are converted to correlated control information for document and film drives, scanning galvanometer actuation, and illuminated display indicia for exposure upon the microfilm.

BEST MODE FOR CARRYING OUT THE INVENTION

Figure 1:
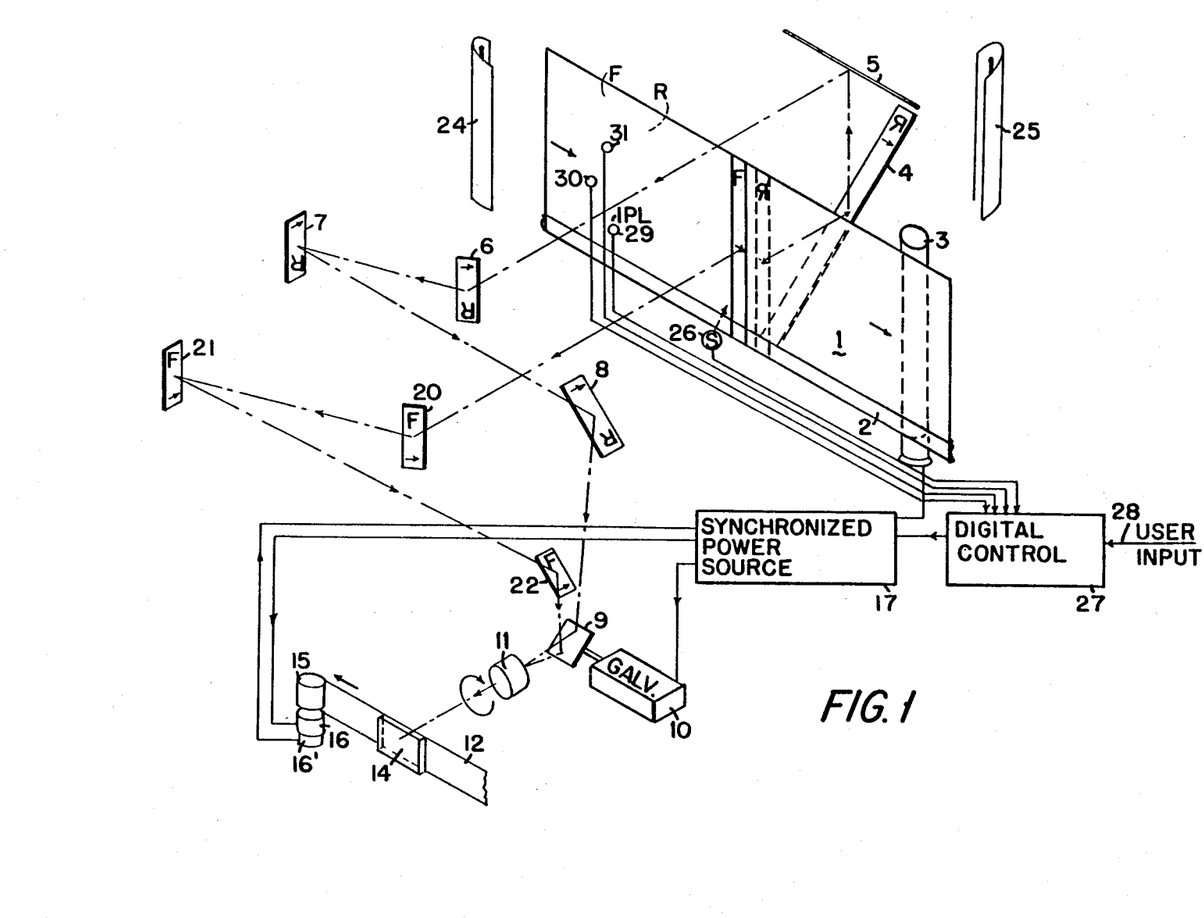
FIG. 1 is a perspective view of the invention.

In FIG. 1, numeral 1 identifies a document to be microfilmed, having a front side "F" and a rear side "R". The document is translated in the direction of its length by known means, such as flexible belt arrangement 2, having drive means 3, such as an electric motor driving known pinch rollers or a vacuum belt.

The apparatus may be constructed in any size, but a typical size is such as to accept bank checks of the personal size of 15 centimeters (cm) long by 7 cm high, and the business size of 21 cm long by 7.8 cm high.

For such purposes; a tall, narrow, first-surface mirror 4, having a size of approximately 11 cm high by 1.5 cm wide, and inclined with the top away from the document at an angle of approximately 45°. A second, like mirror 5 is disposed above mirror 4, with the bottom of the second mirror essentially touching the top of the first mirror, and at an angle to the first mirror of approximately 90°. This directs an optical path over the document and essentially perpendicularly away from it.

This optical path is intercepted by strip mirror 6, which is positioned forward of the document and disposed vertically with its reflecting surface at an angle of approximately 55° to the plane of the document, such as to reflect an incremental view of the rear of the document approximately parallel to the document and towards the left in FIG. 1.

The optical path is next intercepted by strip mirror 7, disposed vertically with its reflecting surface at approximately a right angle to the plane of the document. The length of the optical path between mirrors 5 and 6 is approximately 32 cm and between mirrors 6 and 7 is approximately 10.5 cm.

The optical path is then reflected approximately parallel to the plane of the document, and from left to right in FIG. 1 until it is further intercepted by strip mirror 8 at a distance of approximately 4 cm. The plane of mirror 8 is approximately perpendicular to the plane of the document and the mirror is inclined to the vertical approximately 45°, so that the optical path is directed essentially vertically downward. Each strip mirror is approximately 2 cm wide by 4 cm high.

The optical path is then intercepted by galvanometer mirror 9, the plane of which has a central orientation of approximately 45° to the plane of the document and reflects the path away from the document. This mirror is approximately 2 cm square. It is rotated approximately 6° by galvanometer 10, which may be a known instrument having an upper frequency response of approximately 65 hertz.

The optical path is then directed substantially horizontally away from the document and into lens 11. This lens is preferably panchromatic in order to properly handle essentially white light. It has an f number of 4.5, a focal length of 1.6 cm, and two cylindrical lens elements to compensate for trapezoidal distortion because of the angular path deflection by mirror 9.

Film 12 lies in the focal plane of the image formed by lens 11 of the "slice" of the rear of document 1. The film is accurately maintained in that plane by vacuum platen 14, which is behind the film with respect to lens 11 and which holds the film planar at its front surface by a vacuum maintained within the platen by known vacuum-producing means (not shown).

Capstan 15 is also provided with an internal vacuum so that film 12 closely adheres thereto. The vacuum at both elements 14 and 15 are maintained at all times. These are such that the film is dragged over the surface of the vacuum platen when it is moved by capstan 15. The film emulsion is on the side opposite to the surface of the vacuum platen and thus is not damaged.

Capstan 15 is rotated between exposures. The exposures are made with the film stationary. Although document 1 is moving at this time, the image thereof on the film is stationary because of the demotionalizing rotation of galvanometer mirror 9. The capstan is rotated by motor 16, which may be of the D.C. servo type.

Synchronized power source 17 provides synchronous power to the motor of document drive means 3, galvanometer 10, and capstan motor 16.

Typically, continuous power is supplied to drive means 3 to normally present one document after the other, with a relatively narrow space between, to the front and rear optical paths previously mentioned.

Sensor 26 sends a signal to power source 17 when a document has entered and when it has exited the optical gate.

Synchronously therewith power of one polarity is supplied to galvanometer 10 during the passage of a document through the optical paths region. The energization of the galvanometer is such that mirror 9 moves from its uppermost position to its lowermost position during the full passage of the document.

Thereafter, a steep pulse of power of opposite polarity occurs, which quickly brings mirror 9 back to its initial position. The return excursion is completed in less than 2 milliseconds. This is safely less than the time available between documents that are spaced 4 cm apart with a document translation speed of 1,000 cm per second.

At this return pulse time, equivalent energization of capstan motor 16 takes place a sufficient amount to move film 12 to the next adjacent unexposed area. This is approximately 8 cm divided by the demagnification ratio of lens 11, which is typically 50 to 1, thus approximately 0.16 cm plus a spacing of 0.04 cm.

The accurately synchronized circuits of power source 17 are depicted in part of FIG. 2, to be later described.

Strip mirror 20 is disposed in an equivalent manner to prior strip mirror 6, but is spaced therefrom and receives an incremental view of the front of document 1, that is 29 cm away. This front-of-document optical path is next intercepted by strip mirror 21, which is the equivalent of prior mirror 7. The optical path between mirrors 20 and 21 has a length of 27.5 cm. This is nearly three times the path length between rear mirrors 6 and 7. The purpose is to arrange the overall optical path length from document 1 to film 12 to be the SAME for front and rear of the document, thus allowing the use of a single lens 11 and both images to be in focus upon film 12.

The optical path is then intercepted by strip mirror 22, the equivalent of prior mirror 8. The path from mirror 21 to mirror 22 is 19.5 cm. Mirror 22 is oriented to reflect the front side of the document down to galvanometer mirror 9 approximately parallel and relatively adjacent to the reflection of the rear side of the document as previously discussed.

This front reflection is seen by lens 11 and is imaged upon film 12 transverse to the length thereof and adjacent to the image of the back side of the document. Thus, each front and back pair of images of each document 1 are side-by-side. The pair for the next document is below the first pair, and so on, in the manner of frames upon a motion picture film. Thus, the designation "cine-mode".

The adjacency is arranged by slightly different orientation of strip mirror 22 with respect to strip mirror 8, so that not only does the front reflection occupy a different part of galvanometer mirror 9 than does the rear reflection, but the angle of reflection therefrom into lens 11 is such that adjacency results upon film 12.

Each of the mirrors recited, except galvanometer mirror 9, is rigidly mounted to be stationary and vibration-free. Galvanometer mirror 9 is mounted on the shaft of galvanometer 10 to rotate as has been described but to be vibration-free.

In order to adjust the two paths to equivalency, at least one mirror in each path is supported on an adjustable mount. Typically, these are mirrors 8 and 22, which are made adjustable as to optical path length and as to orientation of the positions of the two images, front and rear of the document, as desired upon film 12.

Film 12 may have a width of 16 mm and be without sprocket holes. The meaningful translation of it is accomplished by vacuum capstan 15 and sprocket holes would only waste otherwise useful areas of the film. As practiced, substantially all of width of the 16 mm film is utilized for the images of the document. The apparatus can be constructed to employ 35 mm film, or film of other widths, by understandable modification of the capstan, changing the demagnification ratio of lens 11, and adjustment of the adjustable mirrors 8 and 22.

By the arrows shown on the document in FIG. 1, it moves from left to right and the film 12 moves from right to left. This is the known reversal of image and motion characteristic of a single lens; i.e., lens 11.

There are six mirrors in the optical path from the rear of the document to the lens and four mirrors in the optical path from the front of the document to the lens.

One galvanometer mirror is used, giving only one motional direction. The left image on the film is of the rear (R) of the document. It reads from left to right and is upright. The right image on the film is of the front (F) of the document. It reads from right to left and is inverted.

For optical viewing of the photographically developed film a simple projector system can be used, employing one objective lens. One such lens optically inverts. Thus, the front of the document is seen reading from left to right and upright. A similar optical system is used for providing hard copies.

Sources of illumination are required for illuminating the front and rear of document 1, particularly the narrow vertical increments thereof that are mirrored in mirrors 4 and 20. As shown, light source 24 illuminates the front of the document and light source 25 illuminates the rear of the document.

The intensity of illumination required increases in direct proportion to the speed of translation of document 1 and inversely proportional to the photographic sensitivity of film 12. The illumination should be approximately 18,000 foot lamberts upon the document for a speed of translation of 1,000 cm/sec. and a sensitivity rating of film 12 of 160.

This illumination can be supplied by one 250 watt halogen lamp, as available from G.E., at each side of the document gate at a distance of 14 cm. These lamps are each housed in a reflector having an elliptical cross-section. The reflector images the filament of each lamp in a line of light that is approximately equal to the width of the document gate and extends the height thereof.

Figure 2:
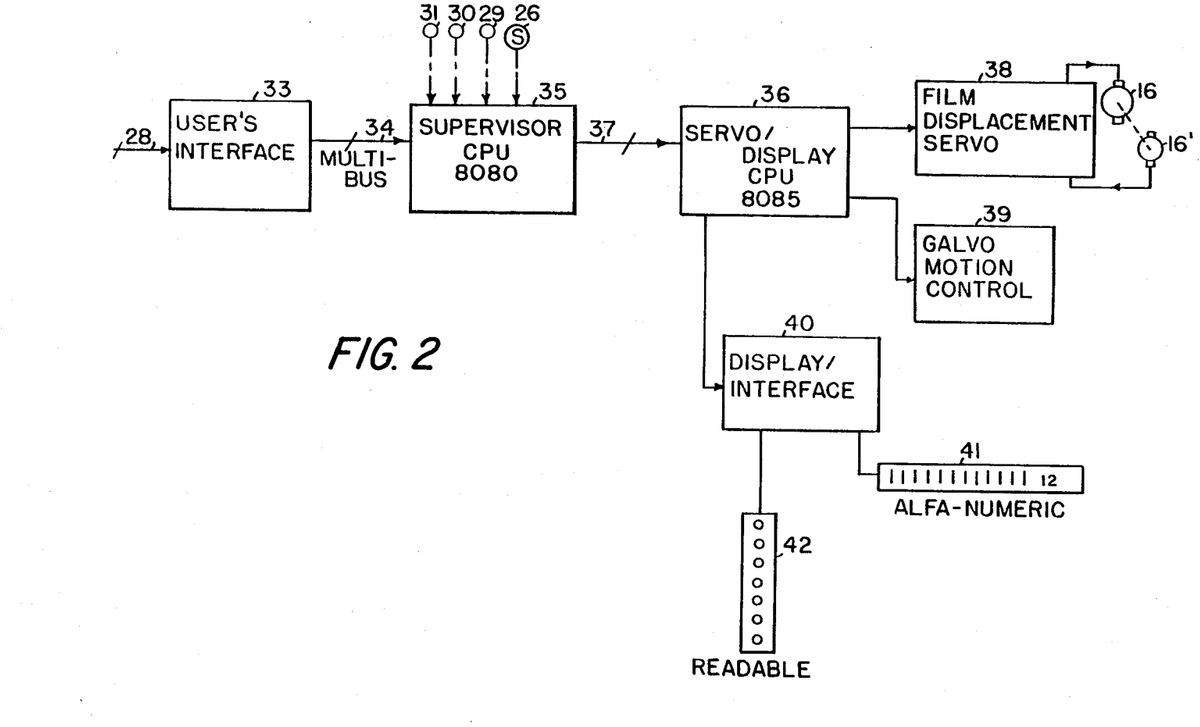
FIG. 2 is a block diagram of the electronic digital control.

Part of FIG. 2 is a block diagram of the digital control 27 of FIG. 1. User's interface 33 accepts commands from user's control circuitry via conductors 28 for the overall control of the apparatus of this invention. The output from interface 33 is conveyed via multibus 34 to supervisor Central Processing Unit (CPU) 35. The multibus is a plural-conductor passive connective means, such as made by Intel, and provides digital data and control lines from one element to the next.

The bus-structured user interface is provided so that to connect to different user's circuitry it is only necessary to design a different user's interface 33. All of the other apparatus of this invention need not be changed; an advantage.

Supervisor CPU 35 includes an 8080 CPU unit, such as made by Intel. It serves to pass on pertinent commands from the user's interface 33 to servo/display CPU 36. This is accomplished by bus 37, which includes 8 data lines with handshake. The supervisor CPU 35 also monitors the film activity; i.e., the film loop, that there shall be proper tension in the film. Also, malfunction transducers are monitored; such as "camera door open", "failure to advance film", and whether the capping shutter responded in time, to maintain filming integrity.

Servo/Display CPU employs an 8085 CPU unit, as by Intel. It provides a control output for Film Displacement Servo 38, which appropriately energizes capstan motor 16 of FIG. 1, which may be a linear servo motor.

Servo/Display CPU 36 further energizes Galvo Motion Control 39. The galvo is an electrically energized device capable of deflecting mirror 9 over an angle of 6°, typically. This may be the known galvanometer in which a loop or coil of wire receives electric current, and being in a magnetic field, is caused to rotate. For the 1,000 cm/sec. translation speed of document 1, a linear-function rotation of mirror 9 for a 23 cm long document of 22.5 milliseconds duration a return to the starting position in less than 2 milliseconds is required and can be attained.

Servo/Display CPU 36 also provides an output to control Display/Interface 40. This typically provides for a 12 digit alpha-numeric identification 41 of alternate document images. It is possible to electronically supply this identification for every image, but there is insufficient longitudinal space along the filmstrip for the 12 digits with the desired spacing for the pairs of images.

Display/Interface 40 also powers a row of illuminating sources, such as seven light-emitting-diodes 42 (LEDs) which are energized coactively with the motion of film 12 to give a human-readable header, or title, for the sequence of film.

Details of the entities recited in FIG. 2 are supplied in following figures.

Figure 3:
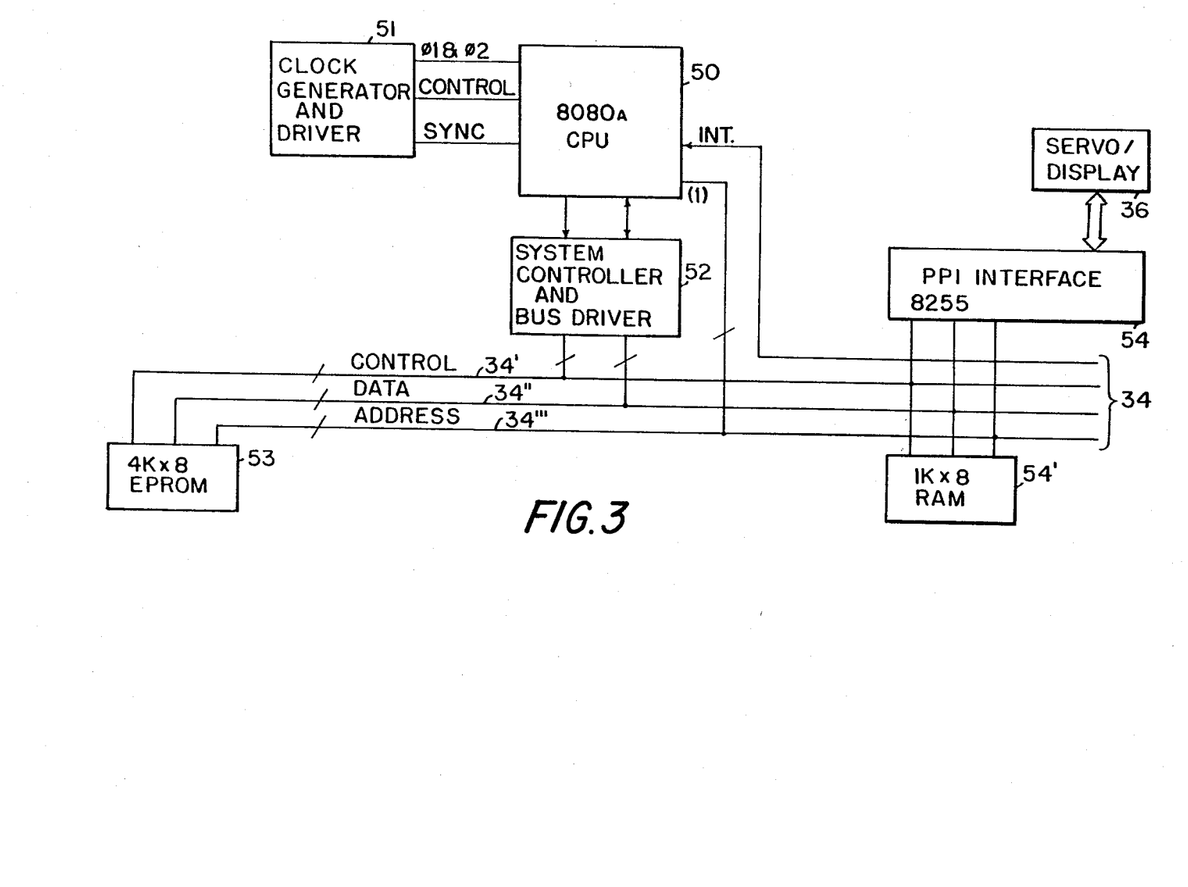
FIG. 3 is a block diagram of the supervisor board of the digital control.

FIG. 3 shows the hardware architecture of Supervisor CPU apparatus 35. Contained within that architecture is an 8080(A) CPU chip 50 and all of the control circuits that are required to operate it. The CPU chip may be an Intel 8080A. The devices required to operate the CPU chip are set forth below.

Clock generator and driver 51 actuates the chip at a desired rate, such as 18.4 Megahertz (MHz), being supplied to the chip in $\phi 1$ and $\phi 2$. Control signals and synchronizing signals are also supplied. The clock generator and driver may be an Intel 8224.

System controller and bus driver 52 obtains control from the CPU chip and receives and provides address data to the same. It is also connected to control bus 34' of 5 conductors and data bus 34" of 8 conductors of multibus 34. Address bus 34''' is directly connected to CPU chip 50 and typically has 16 conductors. Bus driver 52 communicates to multibus 34 and to the bus of CPU chip 56 of FIG. 4. The latter talks to memory 53, of FIG. 3, which is typically of the 4K×8 EPROM type and is connected to multibus 34.

The groups of conductors 34', 34" and 34''' of multibus 34 pass into PPI interface 54, an 8255 (Intel) type of parallel connection. This services the user's I/O and provides a data communication path to Display/servo CPU board 36.

A 1K×8 random access memory (RAM) 54' is similarly connected to bus 34 and is used for scratch-pad purposes.

The connection of address bus 34''' to chip 50 is at terminal (1) to properly route microprocessor data to RAM, ROM and I/O entities.

Similarly, a bus interrupt conductor on multibus 34 enters CPU chip at INT. to temporarily interrupt the processing of the CPU to insert a necessary notification as to other higher priority processing to be accomplished.

PPI interface 54 is connected in mode 1 handshake manner to Servo/display CPU apparatus 36. The latter is detailed in FIG. 4.

Figure 4:
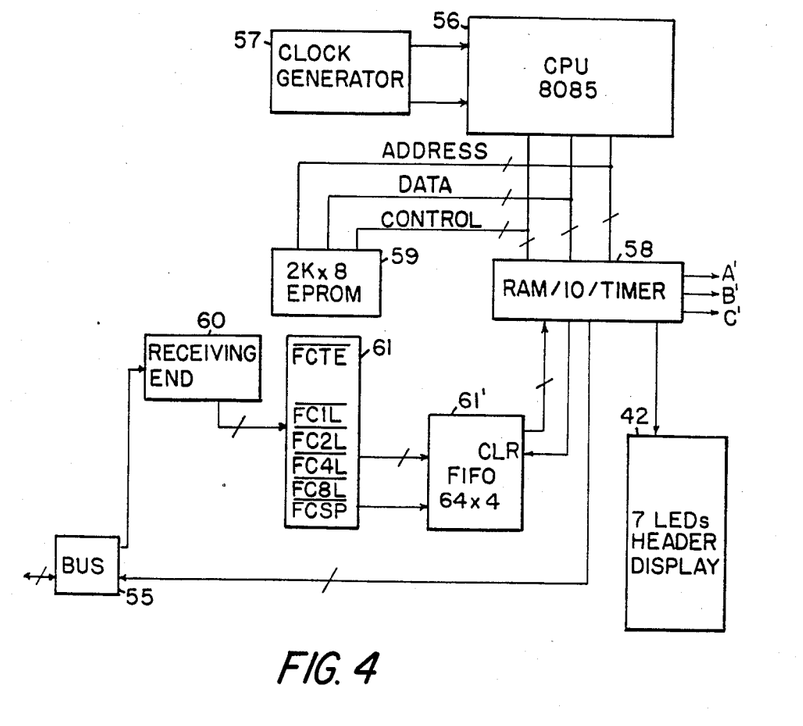
FIG. 4 is a block diagram of the servo/display board of the digital control.

In FIG. 4 the principal item is the 8085 CPU 56. This is fed to I/O communications bus 55, which connects back to prior CPU chip 50. Twelve conductors connect to RAM/IO/Timer entity 58, which may be an Intel 8156, or equivalent, and therefrom to chip 56 CPU via three groups of conductors for address, data and controls, respectively.

Another conductor from bus 55 passes to Receiving end 60, which is an I/O interface servicing user's data to generate the human-readable and the image number displays. An output therefrom over 6 conductors, entity 61, which is a representation of what signals are received from Receiving end 60 and pass on to FIFO buffer 61'.

In entity 61 $\overline{\text{FCTE}}$ pertains to user's data and stands for "Film Count Transmit Enable" and $\overline{\text{FCSP}}$ for "Film Code Strobe Pulse", respectively.

The user's data have a code byte at the beginning of each item of data that is a command to be interpreted as to whether the data is to be displayed by human readable means 42 or number display 41 (See FIG. 2). The $\overline{\text{FC1L}}$ through $\overline{\text{FC8L}}$ of entity 61 identify BCD (Binary Coded Decimal) bits 1, 2, 4, 8. The FC and L are acronyms for the data thus assigned.

FIFO 61' is a first-in first-out device for buffering the incoming data until CPU 56 is ready and able to act upon it. FIFO 61' may be a type AM2841 that is manufactured by Advance Micro Devices, and has a 64 by 4 capacity. The SI input from entity 61 accomplishes shift input transfer.

The incoming data rate is faster than CPU 56 can accept. Once entity 61 signals that the transmission cycle is complete, the data being temporarily stored in FIFO 61', the CPU calls it out at its own rate for use in the CPU. The $\overline{\text{FCSP}}$ of entity 61 is the transfer pulse of the ASCII (American Standard Code II) data to be imaged; i.e., $\overline{\text{FC1L}}$ through $\overline{\text{FC8L}}$.

Properly, FIFO 61' does not accept data beyond that in a given transmission cycle. Upon being reset by entity 58 by a reset pulse delivered to the CLR terminal of the FIFO, it then again becomes active and accepts the next transmission of data.

Another output from entity 58 enters the seven LED (light-emitting-diode) header display 42, which is part of the indicia shown in FIG. 2.

Memory 59, typically a 2K×8 EPROM, is connected to CPU 56 and provides firmware storage for the same.

Clock generator 57 typically operates at 3.93 MHz and is connected to the 8085 CPU chip by two conductors. This is a source clock for internal operation of this CPU. The clock may be a crystal only with the specified apparatus.

Figure 5:
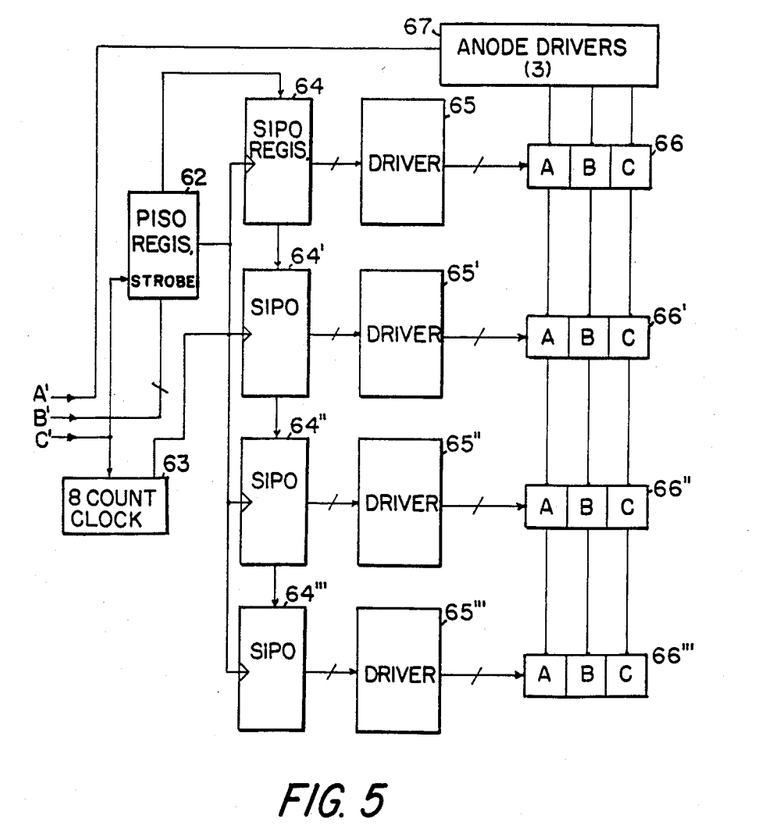
FIG. 5 is a block diagram of the display/interface board of the digital control.

FIG. 5 is the block diagram of the Display/interface board of the digital control. This board is closely related to that of FIG. 4.

Parallel-in series-out (PISO), a shift register out, 62 receives an actuating eight-conductor input from RAM/IO/Timer 58 of FIG. 4, over connection B'. Eight count clock 63 and the strobe of register 62 are both connected to entity 58 over connection C'. These devices may be a 74165, or equivalent, and a 74160, or equivalent, respectively, manufactured by Texas Instruments, National Semiconductor, or other.

Register 62 provides an output to plural series-in parallel-out registers, such as 64, 64', 64" and 64'". These may be 74164 units, manufactured by Texas Instruments or National Semiconductor. Each is provided with a shift clock input from eight count clock 63.

Each register 64 through 64'" provides an output over 14 conductors to a corresponding driver 65 through 65'", which drivers may be a DD700 by Beckman Instruments.

Each driver, in turn, provides an output over 14 conductors to cathodes of gas-discharge displays 66 through 66'", each having an A, B and a C portion. These are 4 digits common anode to each bank, and is a multiplex display. An output from RAM/IO/Timer 58 passes over connection A' to a group of 3 anode drivers 67, which serially connect all portions "A" together, and ditto for "B" and for "C".

These elements function to multiplex the number displays in groups of 3 to image the I.D. numbers upon the microfilm.

Figure 6:
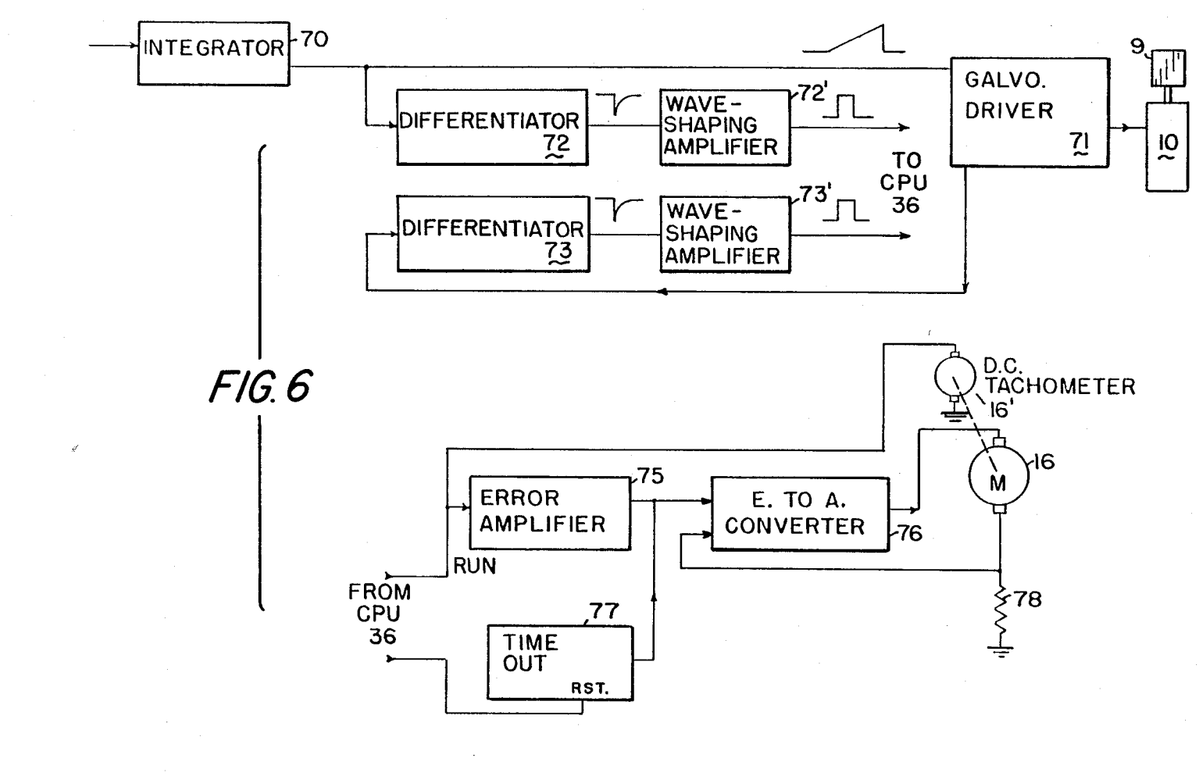
FIG. 6 is a block diagram of the galvo driver and servo amplifier for translating the film strip.

FIG. 6 shows the block diagram for the galvo driver; i.e., the circuit for powering the means to rotate 10 the single mirror 9 of FIG. 1. A current ramp waveshape for the useful scan has a linear rise for obtaining photographic integrity, and a quick return occurring during the interval between moving documents 1.

A scan command pulse having a nominal rectangular shape and a duration to equal the time of passage of one document across the illuminated gate in FIG. 1 is formed in Servo/display CPU 36. This is impressed upon integrator 70, which may be a type 741, manufactured by National Semiconductor or Texas Instruments. The integrator produces the ramp waveform of voltage desired. This is fed into Galvo driver 71, a power amplifier that may have a current output at the peak of the ramp of one-half ampere.

A first differentiator 72 is connected to the output of integrator 70. This gives a short voltage pulse of negative polarity, which is subsequently shaped to a rectangular pulse of positive polarity by wave-shaping amplifier 72' and fed back to Servo/display CPU 36 to signal the "end of ramp" status.

A second differentiator 73 is connected to a return output from driver 71, being obtained from the position output voltage. This differentiation also gives a short voltage pulse that is similarly shaped to a rectangular pulse in wave-shaping amplifier 73'. This is also fed back to CPU 36 and signals "scan completed". The Galvo motion control, or driver, 39 is also shown in FIG. 2.

FIG. 6 also shows the capstan 15 control circuitry. D.C. tachometer 16' of FIG. 1 provides an electrical output proportional to the speed of rotation of the means to translate the film; that is, capstan 15. This output enters error amplifier 75. When a command is given motor 16 to "stop", tachometer 16' gives an output to the error amplifier to promote stopping.

Another input to the error amplifier comes from Servo/display CPU of FIG. 2. This is the desired electrical amplitude against which the output of the tachometer is compared.

The output from the error amplifier becomes one input to voltage-to-amperage converter 76; this being a trans-conductance type amplifier. Also a part of that input is an output from Time out device 77, which is reset at its "RST" input by an output from Servo/display CPU 36. Device 77 acts to ground the input command if the amplifier remains saturated for nominally more than 10 milliseconds. This is to protect capstan motor 16.

The output of converter 76 energizes motor 16, which revolves to translate film 12. The current through the motor also passes through resistor 78. This resistor is of low ohmage, say 1 ohm, and serves to develop a voltage proportional to the current through the motor. This voltage becomes a second input to converter 76, to provide that feedback thereto.

Certain sensors coactive with the documents 1 act to establish control for entities 10 and 16 of FIG. 6.

Sensor 26 at the optical gate in FIG. 1 supplies an electrical input to Supervisor CPU apparatus 35 of FIG. 2 for indicating when a document has entered and has exited the optical gate. Similarly, IPL 29 (Item Presence Level) is a sensor of the presence of a document, and is typically means for directing light across the document path in the absence of a document and a companion light sensitive means, a photo-transistor, to respond to the light. When a document is present the light is obscured from the photo-transistor, and so a signal occurs.

The IPL sensor is located in advance of the optical gate a distance of a few centimeters so that the scanning ramp of galvanometer 10 can be timely started. This is ahead of the useful scan portion of the ramp, which is linear.

Similarly, medium height sensor 30, above and forward of the IPL sensor in FIG. 1, is interrupted to produce a signal by a document of medium height.

Further, large document sensor 31 is disposed adjacent to, but farther above sensor 30. It is interrupted by a large document, which also interrupts sensor 30 as well.

Figure 7:
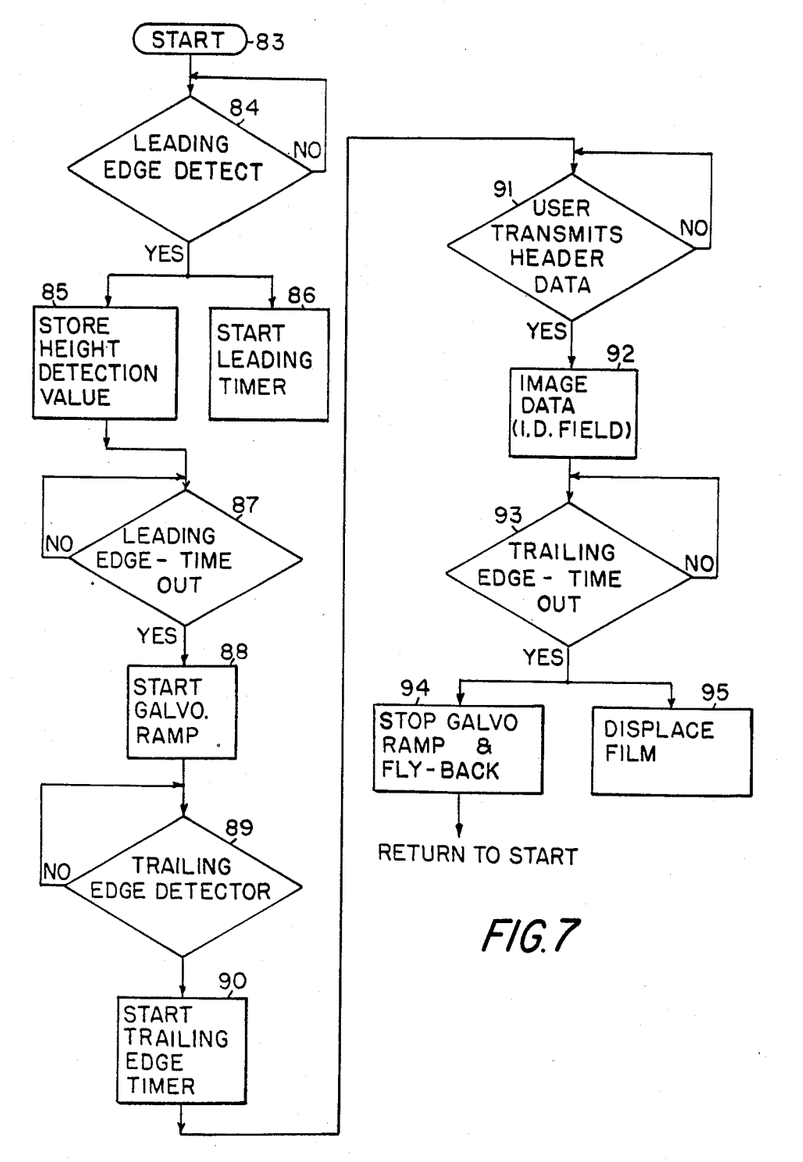
FIG. 7 is a flow chart for the camera apparatus.

Inputs from all of these sensors enter Supervisor CPU Apparatus 35, shown in FIG. 2, where logical deductions are made to properly operate the camera, as is set forth in flow diagram FIG. 7.

In FIG. 7 "Start" 83 signifies that the apparatus has been put in operative condition.

The first activity is "Leading edge detect" 84, which when "Yes" signifies that a document has arrived at IPL sensor 29, as propelled by belt 2 of FIG. 1. Until that occurs the "No" loop continues around decision point 84.

A "Yes" from the above passes the activity to "Store height detection value" 85. This information comes from sensors 29, 30 and 31, as to small, medium or large document, respectively, as has been previously explained.

A concurrent activity is also passed to "Start leading timer" 86 upon a "Yes" from entity 84. Sensor 29 is purposely located in advance of the optical gate so that galvanometer 10 can be synchronized to the motion of the document and the rotative sweep thereof started. This insures that the sweep will be linear when the document does reach the optical gate.

Decision point 87, "Leading edge time out", gives a "No" output until such time as the leading edge has just entered the optical gate, and then gives a "Yes" output. This is transmitted to "Start galvo ramp" 88 and that ramp does start.

Thereafter, decision point "Trailing edge detector" 89 queries whether the trailing edge is about to leave the IPL location, as discerned by sensor 29. When that answer is "Yes" the "Start trailing edge timer" 90 function is activated. This timer gives the time when the galvo ramp is to be shut off. This will be when the trailing edge clears the optical gate.

The next decision point "User transmits header data" 91 is activated and traverses the "No" loop until that data is sent by the user apparatus. This is through the FC1L to FC8L lines of entity 61 of FIG. 4. This will be an ID (identification) number for that document, to be imaged upon the film. This occurs within a time interval of approximately 2 milliseconds after the document leaves the IPL position. This is the "Image data (I.D. field)" 92 entity in the flow chart. Therethrough is the control to pass the information to Servo/Display CPU apparatus 36 of FIG. 2, and through Display/interface 40 to energize the gas display tubes, as detailed in FIG. 5.

The next activity is the "Trailing edge time out" decision point 93. This recycles on "No" until the trailing edge leaves the optical gate, and then goes to "Yes". When this occurs the "Stop galvo ramp & fly-back" 94 is activated. This, of course, does stop the photographic sweep of mirror 9 and returns it to its starting position within approximately 2 milliseconds, as has been previously described; to be ready for the next sweep as soon as the next document enters the optical gate.

Also activated upon a "Yes" from the "Trailing edge time out" is the "Displace film" activity 95.

The amount of the displacement is fixed by the height detect value of the document. For example, when the documents are banking checks; for personal checks having a height of 7 cm the displacement is approximately 0.16 cm for film 12, and for business checks having a height of 7.8 cm the displacement is approximately 0.176 cm. This is as has been previously explained.

When these activities have been accomplished, the processing according to FIG. 7 returns to "Start" 83 for similar handling of the next document.

For documents of different sizes the apparatus is simply dynamically adjusted to the corresponding new values of distances and correlative parameters. This principally involves CPU 50 and the associated memories of FIG. 3.

We claim:

1. A film camera system for forming stationary images transversely disposed upon a film strip (12) of a continuously moving succession of spaced documents (1), comprising;
   (a) means to move (2,3) said documents,
   (b) plural mirrors (4–8; 20,22) positioned to bring an image of the front and rear of each document adjacently upon a single mirror (9),
   (c) an objective lens (11) between said single mirror and said film strip,
   (d) means to rotate (10) said single mirror (9) transversely of the length of said film strip,
   (e) means to translate (15,16) said film strip, and
   (f) electronic means (17,27) having microprocessor apparatus (35,36) to effect synchronous control of said means to translate (2,3) said documents, said means to rotate said single mirror (9), and intermittently said means to translate (15,16) said film strip (12),
   to form a stationary image of both the front and the rear of each document adjacently and transversely of said film strip for the exposure thereof while it is stationary.

2. The film camera system of claim 1, in which said plural mirrors include;
   (a) a first mirror (4) inclined away from the rear of the document path,
   (b) a second mirror (5) inclined toward said document path above that path,
   (c) a first group (6,7,8) of mirrors oriented to accept an image of the rear of said documents from said second mirror and to direct the same to said single mirror (9), and
   (d) a second group of mirrors (20,21,22) oriented to accept an image from the front of said documents and to direct the same to said single mirror (9) adjacent to said image of the rear of said documents.

3. The film camera system of claim 2, in which;
   (a) each of said first and second groups of mirrors is comprised of three mirrors.

4. The film camera system of claim 3, in which;

(a) the optical path within the first group of said mirrors is shorter than the optical path within the second group of said mirrors.

5. The film camera system of claim 1, in which;
(a) said means to translate (15,16) the film strip from one exposure position to the next is controlled by said electronic means (17,27) to occur while the space between said documents is passing the mirror optical system.

6. The film camera system of claim 5, in which said means to move the film strip comprises;
(a) a vacuum capstan (15) engaging said film strip to translate it longitudinally a selected distance while the space between said documents is passing the mirror optical system.

7. The film camera system of claim 1, which additionally includes;
(a) a vacuum platen (14) for adhesively holding said film strip while it is stationary.

8. The film camera system of claim 1, in which;
(a) said means to rotate said single mirror is an electrically energized device (10).

9. The film camera system of claim 8, in which;
(a) said means to rotate said single mirror is a galvanometer (10).

10. The film camera system of claim 1, which additionally includes;
(a) means to form (41,42) illuminated indicia for exposing indicia upon said film strip (12), said means to form disposed adjacent to said film strip.

11. The film camera system of claim 1, in which said electronic means includes;
(a) a user's interface (33) for accepting digital commands from user overall command apparatus (28),
(b) supervisor CPU apparatus (35) connected to said user's interface by a multiple-conductor cable (34) and having a CPU unit for effecting supervisory control of said film camera system,
(c) a servo/display CPU apparatus (36) connected to said supervisor CPU apparatus by a plural-conductor cable (37) for control, and having a CPU unit for effecting control of subsequent apparatus,
(d) a film displacement servo (38) connected to said servo/display CPU apparatus for control of said means to translate (15,16) said film strip (12),
(e) a galvo motion control (39) connected to said servo/display CPU apparatus for the control of said means to rotate (10) said single mirror (9), and
(f) a display interface (40) connected to said servo/display CPU apparatus for control of indicia (41,42) to be exposed upon said film strip (12).

12. The film camera system of claim 11, in which said supervisor CPU apparatus (35) includes;
(a) a CPU unit (50),
(b) a clock generator and driver (51) plurally connected to said CPU unit for energizing the same,
(c) a system controller and bus driver (52) connected to said CPU unit and to said multiple conductor cable (34), and
(d) a memory (53) connected to said multiple conductor cable.

13. The film camera system of claim 11, in which said servo/display CPU apparatus (36) includes;
(a) a CPU unit (56),
(b) a clock generator (57) plurally connected to said CPU unit for energizing said CPU unit,
(c) a random access memory / input-output / timer device (58) plurally connected to said CPU unit to provide environmental support for said CPU unit, and
(d) a memory (59) plurally connected to said CPU unit to store firmware for said CPU unit.

14. The film camera system of claim 13, in which said display/interface apparatus (40) includes;
(a) a parallel-in series-out shift register (62) connected to said random access memory / input-output / timer device (58) for actuation thereby,
(b) a clock (63) connected to the shift register (62) and receiving an input from the random access memory / input-output / timer device (58) for mutual actuation,
(c) plural series-in parallel-out entities (64-64''') connected to the shift register (62) and to said clock (63) for selective actuation of said entities, and
(d) corresponding drivers (65-65''') and corresponding illumination elements (66-66''') connected to corresponding entities for selective actuation of said illumination elements.

* * * * *